United States Patent
Aggarwal et al.

(10) Patent No.: US 8,798,034 B2
(45) Date of Patent: Aug. 5, 2014

(54) SYSTEM AND METHOD FOR SELECTING A ROUTE BASED ON LINK METRICS INCORPORATING CHANNEL BANDWIDTH, SPATIAL STREAMS AND/OR GUARD INTERVAL IN A MULTIPLE-INPUT MULTIPLE-OUTPUT (MIMO) NETWORK

(75) Inventors: Pankaj Aggarwal, Lake Mary, FL (US); Hrishikesh Gossain, Lake Mary, FL (US); Avinash Joshi, Lake Mary, FL (US); Manish Shukla, Altamonte Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 883 days.

(21) Appl. No.: 12/415,687

(22) Filed: Mar. 31, 2009

(65) Prior Publication Data
US 2010/0246480 A1    Sep. 30, 2010

(51) Int. Cl.
*H04L 12/26*    (2006.01)
*H04L 12/28*    (2006.01)

(52) U.S. Cl.
USPC ............ 370/351; 370/229; 370/230; 370/356

(58) Field of Classification Search
None
See application file for complete search history.

(56) References Cited

U.S. PATENT DOCUMENTS

| | | | | |
|---|---|---|---|---|
| 5,317,566 A | * | 5/1994 | Joshi | 370/238 |
| 5,687,168 A | * | 11/1997 | Iwata | 370/255 |
| 5,933,425 A | * | 8/1999 | Iwata | 370/351 |
| 6,034,946 A | * | 3/2000 | Roginsky et al. | 370/238 |
| 6,046,985 A | * | 4/2000 | Aldred et al. | 370/252 |
| 7,061,925 B2 | | 6/2006 | Joshi | |
| 7,280,483 B2 | * | 10/2007 | Joshi | 370/238 |
| 7,376,122 B2 | | 5/2008 | Draves et al. | |
| 7,512,074 B2 | * | 3/2009 | Strutt et al. | 370/238 |
| 8,149,717 B2 | * | 4/2012 | Gossain et al. | 370/238 |
| 8,400,909 B2 | * | 3/2013 | Ofuji et al. | 370/210 |
| 8,494,083 B2 | * | 7/2013 | Lee et al. | 375/295 |
| 2002/0049855 A1 | * | 4/2002 | Porotsky | 709/238 |
| 2002/0085495 A1 | * | 7/2002 | Jeffries et al. | 370/235 |
| 2003/0115360 A1 | * | 6/2003 | Edwin et al. | 709/240 |
| 2003/0185153 A1 | * | 10/2003 | Kohler et al. | 370/230 |
| 2004/0071082 A1 | * | 4/2004 | Basu et al. | 370/229 |
| 2004/0083273 A1 | * | 4/2004 | Madison et al. | 709/217 |
| 2004/0246935 A1 | | 12/2004 | Joshi et al. | |
| 2004/0260808 A1 | * | 12/2004 | Strutt | 709/224 |
| 2004/0264372 A1 | | 12/2004 | Huang | |

(Continued)

OTHER PUBLICATIONS

Draves et al.—Comparison of Routing Metrics for Static Multi-Hop Wireless Networks—2004.*

(Continued)

*Primary Examiner* — Marsha D Banks Harold
*Assistant Examiner* — Christopher Wyllie
(74) *Attorney, Agent, or Firm* — Randi L. Karpinia; Brian M. Mancini (57) ABSTRACT

Systems and methods are provided for determining a link metric for a communication link along a path between a source node to a destination node is provided. A node can generate a link metric (LM) for the communication link between the particular node and next-hop node towards the destination node in the path based on a plurality of variables. The node can determine the LM for the communication link based on a plurality of variables including: bandwidth on the communication link, a number of spatial streams used to transmit over the communication link, and a guard interval used used to transmit over the communication link.

13 Claims, 4 Drawing Sheets

(56) References Cited

U.S. PATENT DOCUMENTS

| | | | |
|---|---|---|---|
| 2004/0264466 A1* | 12/2004 | Huang | 370/392 |
| 2005/0286426 A1* | 12/2005 | Padhye et al. | 370/238 |
| 2006/0098611 A1 | 5/2006 | Joshi et al. | |
| 2006/0098612 A1 | 5/2006 | Joshi et al. | |
| 2006/0109787 A1* | 5/2006 | Strutt et al. | 370/235 |
| 2007/0230346 A1* | 10/2007 | Yamada et al. | 370/235 |
| 2008/0151933 A1* | 6/2008 | Vasseur et al. | 370/468 |
| 2008/0232258 A1* | 9/2008 | Larsson et al. | 370/238 |
| 2009/0028258 A1* | 1/2009 | Ma et al. | 375/260 |
| 2009/0141633 A1* | 6/2009 | Schollmeier et al. | 370/235 |
| 2009/0147722 A1* | 6/2009 | Ramachandran | 370/315 |
| 2009/0232113 A1* | 9/2009 | Tamaki | 370/337 |
| 2009/0245159 A1* | 10/2009 | Oyman et al. | 370/315 |
| 2009/0312018 A1* | 12/2009 | Moulsley et al. | 455/435.1 |
| 2010/0002598 A1* | 1/2010 | Pan et al. | 370/252 |
| 2010/0183087 A1* | 7/2010 | Hosokawa et al. | 375/262 |
| 2010/0278118 A1* | 11/2010 | Gossain et al. | 370/329 |
| 2012/0014340 A1* | 1/2012 | Jin et al. | 370/329 |
| 2013/0177110 A1* | 7/2013 | Rangarajan et al. | 375/343 |

OTHER PUBLICATIONS

Draves et al.—Routing in Multi-Radio, Multi-Hop Wireless Mesh Networks—2004.*
Draves et al., "Comparison of Routing Metrics for Multi-Hop Wireless Networks," Microsoft Research; SIGCOMM, Aug. 30, 2004, 12 pages.
Couto et al., "A High-Throughput Path Metric for Multi-Hop Wireless Routing," Proceedings of the 9th ACM International Conference on Mobile Computing and Networking, Sep. 2003, 13 pages.
Draves et al., "Routing in Multi-radio, Multi-hop Wireless Mesh Networks," ACM MobiCom, Philadelphia, PA, Sep. 2004, pp. 114-128.
IEEE 802.11 (11-07/063r1), "Airtime Metric," May 9, 2007, pp. 1-3.
Perkins, C., et al., "Ad hoc On-Demand Distance Vector (AODV) Routing," Network Working Group, RFC 3561, Jul. 2003.

* cited by examiner

SYSTEM AND METHOD FOR SELECTING A ROUTE BASED ON LINK METRICS INCORPORATING CHANNEL BANDWIDTH, SPATIAL STREAMS AND/OR GUARD INTERVAL IN A MULTIPLE-INPUT MULTIPLE-OUTPUT (MIMO) NETWORK

FIELD OF THE DISCLOSURE

The present disclosure relates generally to wireless communications and more particularly to path/route selection in wireless mesh communication networks.

BACKGROUND

An infrastructure-based wireless network typically includes a communication network with fixed and wired gateways. Many infrastructure-based wireless networks employ a mobile unit which communicates with a fixed base station that is coupled to a wired network. The mobile unit can move geographically while it is communicating over a wireless link to the base station. When the mobile unit moves out of range of one base station, it can connect or "handover" to a new base station and starts communicating with the wired network through the new base station.

In comparison to infrastructure-based wireless networks, an ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multihopping") until the packets reach the destination node. As used herein, the term "multihop network" refers to any type of wireless network which employs routing protocols among nodes which are part of a network. In such situations, each intermediate node routes the packets (e.g., data and control information) to the next node along the route, until the packets reach their final destination. Nodes in the mesh network use end-to-end path metrics to select a path, from the multiple path options to any destination. The path metrics are generally sum of the individual link metrics along the path.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures can be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to one embodiment, a method for determining a link metric for a communication link along a path between a source node and a destination node is provided. In accordance with this method, a node can generate a link metric (LM) for the communication link between the particular node and a next-hop node towards the destination node in the path based at least in part on at least one of a plurality of variables.

In one embodiment, the node can determine the link metric (LM) for the communication link based at least in part on at least one of a plurality of variables including: a bandwidth of the communication link, a number of spatial streams used to transmit over the communication link, and a guard interval used used to transmit over the communication link. The node can determine the number of spatial streams used to transmit over the communication link, the guard interval used to transmit over the communication link, and the bandwidth used to transmit over the communication link, and then determine scaling factors for the communication link. The scaling factors comprise at least one of: a scaling factor for a number of spatial streams used to transmit over the communication link, a scaling factor for a guard interval used to transmit over the communication link, and a scaling factor for the bandwidth used to transmit over the link. The node can then determine an average value for each of the scaling factors. The link metric that is determined represents an estimated transmission time associated with communicating information over a particular communication link. In one implementation, this method can be used in an ad-hoc multi-hopping peer-to-peer wireless communications network with nodes that have Multiple-Input Multiple-Output (MIMO) capability to select, based on the sum of link metrics along a path, one of a plurality of paths between the source node and the destination node based on the link metrics (LMs) for each of the paths.

Prior to describing some embodiments with reference to FIGS. 3-4, an example of a wireless communication network configuration in which these embodiments can be applied will now be described with reference to FIG. 1 followed by a description of a node with reference to FIG. 2.

Network

Figure 1:
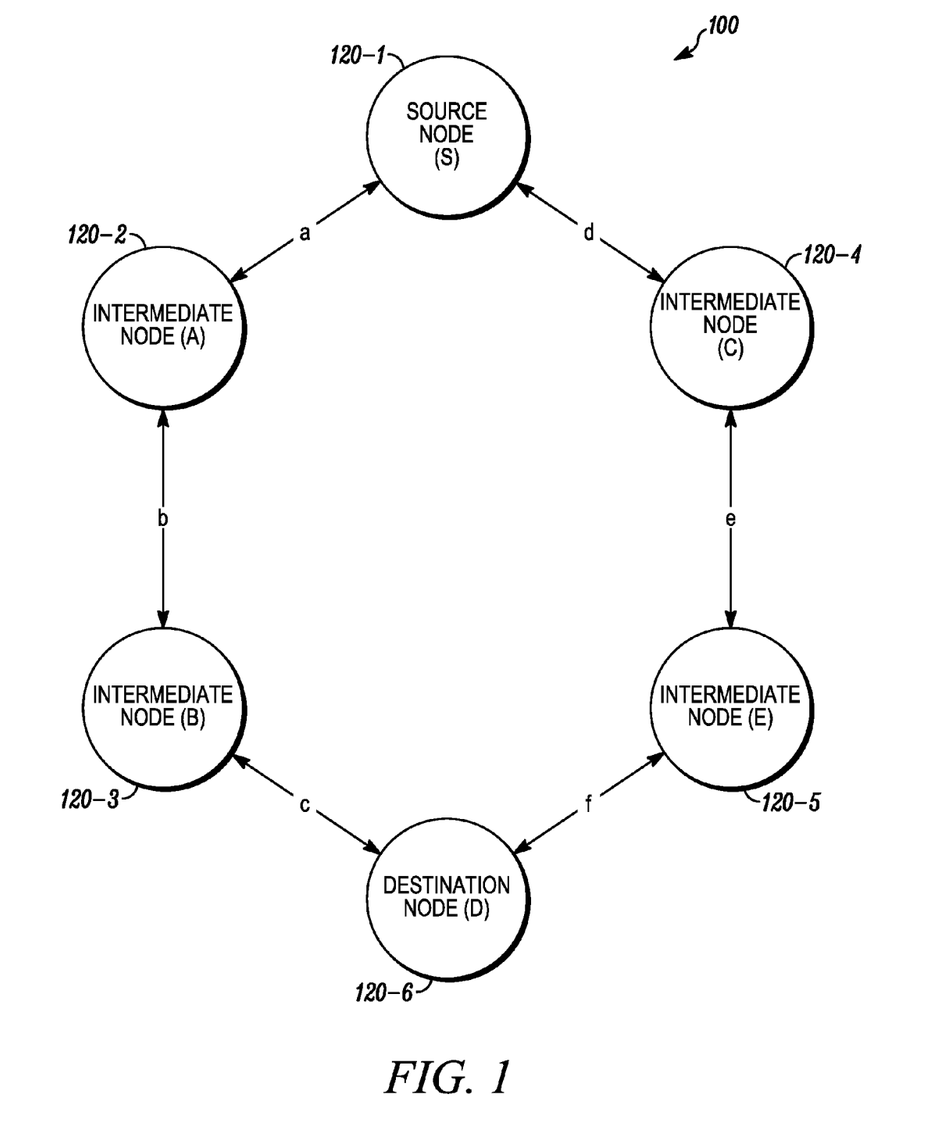
FIG. 1 illustrates a multi-hop wireless communication network.

FIG. 1 illustrates a multi-hop wireless communication network 100 that comprises a number of nodes 120-1 . . . 120-6. Each of the nodes 120 can have MIMO capability. The nodes 120 typically support simultaneous operation in both infrastructureless mode and infrastructured mode and can move seamlessly between infrastructure-based networks (those including for example an Access Point (AP)) and client-based peer-to-peer networks which are free of any infrastructure.

The ad hoc multi-hopping communication network 100 can be created between a plurality of nodes 120 each can have wireless repeater and routing capability, and optionally a wired Access Point (AP) (not illustrated). It will be appreciated by those of ordinary skill in the art that while the ad hoc network 100 in FIG. 1 is shown as operating in an infrastructureless mode (e.g., without APs and/or cellular base stations), in other implementations the network 100 of FIG. 1 can include network infrastructure. For example, at least some of the nodes 120 can support simultaneous operation in both infrastructureless mode and infrastructured mode. In infrastructure mode, an access point (AP) is typically coupled to a wired network (not shown) and can provide one or more sources of audio, video and/or data information. The access point (AP) can be, for example, a cellular base station or other wireless access point/port. It will be appreciated by those of ordinary skill in the art that the nodes 120, can also communicate information packets with a cellular-based network (not shown) over wireless communication medium, each of which includes one or more wireless communication channels depending on the multiple access scheme utilized in the cellular-based network. Moreover, the nodes 120 can move seamlessly between infrastructure-based networks and client-based peer-to-peer networks. Although not illustrated in FIG. 1, one or more of the nodes 120 can be an intelligent access point (IAP). As used herein, the term "intelligent access point (IAP)" refers to any type of access point device that is: (1) connected to a fixed wired network to enable remote mesh nodes to communicate with the fixed wired network and (2) designed to establish and maintain mesh communication links with other mesh nodes, has mesh routing capability and can perform forwarding and/or relaying and/or repeating and/or routing for other mesh nodes. An IAP communicates over wireless mesh network interfaces with other mesh nodes and can act as an access point for those devices. An IAP can route packet(s), including packet(s) generated by a non-mesh or non-routable device associated with it, to the correct remote destination which can be a routable or another non-routable device. In addition to having wireless mesh interfaces to other mesh nodes, an IAP is a mesh-enabled access point (MAP) which has a wired network interface and is coupled to wired connection. A IAP provides other devices with a path for packets to a wired network and possibly with access to a wide area wired network (WAN) and other network appliances (e.g., servers, gateway devices, etc.) that are part of the WAN. An IAP can relay packets between the wireless devices and the wired devices on the wired network or WAN. Thus, a network of IAPs and mesh nodes can enable communication between the wired network and remote wireless nodes which are multiple hops away from the wired network.

In the ad hoc multi-hopping network 100, communications from source node 120-1 can "hop" through each other to other intermediate nodes 120-2 . . . 120-5 in the network to reach destination node 120-6. The nodes 120 can generally be wireless devices capable of receiving packetized audio, video and/or data information. Some of the components of a node, such as a processor, transmitter, receiver and antenna, are described below in FIG. 2. The nodes 120 can exchange information as data packets transmitted over carrier frequencies, each of which includes one or more wireless communication channels.

The mesh nodes 120 are communication devices that can be fixed, potentially mobile or mobile. As used herein, the term "mesh node" refers to a wireless communication device which has mesh routing capability meaning that a mesh node has routing functionality and can route traffic to and from other nodes with routing functionality. The mesh nodes 120 can each act as wireless routers and route data packets between other mesh nodes 120. As such, any two mesh nodes 120 (and/or IAPs) are capable of communicating with each other directly or indirectly. When communicating indirectly, mesh nodes 120, can operate as routers for forwarding or relaying packets being sent between mesh nodes. Routing functionality provided in the mesh nodes 120 allows the mesh nodes 120 to determine the path of least resistance through a mesh network 100. In some cases, this can be the path characterized by the least number of hops to the destination. As will be described below, each of the mesh nodes 120-1 through 120-6 regularly exchanges routing information and switching table information with all peer/neighbor mesh-enabled nodes.

Mesh nodes 120 are capable of routing/forwarding packets and implement a routing protocol. One example of routing protocol is a mesh routing protocol, such as the Mesh Scalable Routing (MSR) protocol disclosed in U.S. Pat. No. 7,061,925 B2, entitled "System and Method for Decreasing Latency in Locating Routes Between Nodes in a Wireless Communication Network," its contents being incorporated by reference in its entirety herein, and/or MSR's proxy routing variant as described in United States published patent application 20060098612, filed Sep. 7, 2005, entitled "System and method for associating different types of nodes with access point nodes in a wireless network to route data in the wireless network", and United States published patent application 20060098611, filed Sep. 7, 2005, entitled "System and method for routing data between different types of nodes in a wireless network."

Routing

As used herein the term "mesh routing algorithm" or "mesh routing protocol" refers to a protocol used by a mesh routing module to determine the appropriate path or route over which data is transmitted. The mesh routing protocol also specifies how nodes in a communication network share information with each other and report changes. The mesh routing protocol enables a network to make dynamic adjustments so that routing decisions do not have to be predetermined and static. A mesh routing protocol controls how nodes come to agree which way to route packets between the nodes and other computing devices in a network. Examples of some ad hoc routing protocols include, for example, protocols, such as, the Ad hoc On-demand Distance Vector (AODV) routing protocol, the Dynamic Source Routing (DSR) protocol, and the Mesh Scalable Routing (MSR) protocol. Any mesh routing algorithm or protocol (or combination thereof) can be used in conjunction with the embodiments described herein.

As will be appreciated by those skilled in the art, mesh routing protocols can be used to create routes through a mesh network using both proactive routing and/or on-demand routing. In proactive routing, an IAP can be configured as a network root. The IAP sends periodic portal announcement messages that are forwarded hop-by-hop through the network, and waits to hear announcement messages from other mesh nodes. As will be described below, each mesh node creates a tree-structured routing table based on metrics from the root announcement messages received from neighboring mesh nodes. By contrast, on-demand routing can be used to find a destination node when there is no proactive route to the destination node. A source mesh node sends requests for the destination node to neighboring mesh nodes. The requests are forwarded along until one reaches the destination node, at which time the destination node then sends a response that is forwarded back to the source mesh node.

As used herein, the term "Ad hoc On-demand Distance Vector (AODV)" refers to a routing protocol for ad hoc mobile networks with large numbers of mobile nodes. The AODV protocol is defined in RFC 3561 by C. Perkins, E. Belding-Royer, and S. Das, "Ad hoc On-Demand Distance Vector (AODV) Routing", http://www.rfc-editor.org/rfc/rfc3561.txt. In this routing protocol, mesh nodes create routes to destination or peers on-demand basis. The protocol's algorithm creates routes between nodes only when the routes are requested by the source nodes, giving the network the flexibility to allow nodes to enter and leave the network at will. Routes remain active only as long as data packets are traveling along the paths from the source to the destination. When the source stops sending packets, the path will time out and close.

Link Metrics

Each node in a wireless ad hoc network is capable of routing. A routing protocol running on source node finds paths or routes between this source node and a destination node. The source node 120-1 can use end-to-end path metrics to select a path, from the multiple path options to the destination node 120-6. The path metrics are generally sum of the individual link metrics along the path. For example, source node 120-1 has two path options to reach the destination node 120-6; the path along S-A-B-D and the path along S-C-E-D. The former path metric is the sum of individual link metrics, a+b+c, and the latter path metric d+e+f. Link Metrics are generally computed by nodes along the path towards destination. In example FIG. 1, link metrics 'a', 'b' and 'c' can be computed by node 'S', node 'A' and node 'B' respectively.

Traditional link metrics generally attempt to quantify how quick and reliable transmissions are over the link. The general philosophy of path selection, based on such metrics therefore is to select links with higher data rate as long as they are sufficiently reliable. Link metric computation can include various channel and communication characteristics like link's frame error rate, link's data rate, transmission overhead, signal to noise ratio factors etc.

Institute of Electrical and Electronics Engineers (IEEE) 802.11n

As used herein, "IEEE 802.11" refers to a set of IEEE Wireless Local Area Network (WLAN) standards that govern wireless networking transmission methods. IEEE 802.11 standards have been and are currently being developed by working group 11 of the IEEE Local Area Network (LAN)/Metropolitan Area Network (MAN) Standards Committee (IEEE 802). Any of the IEEE standards or specifications referred to herein can be obtained at http://standards.ieee.org/getieee802/index.html or by contacting the IEEE at IEEE, 445 Hoes Lane, PO Box 1331, Piscataway, N.J. 08855-1331, USA.

IEEE 802.11n is a proposed amendment to the IEEE 802.11-2007 wireless networking standard to significantly improve network throughput over previous standards, such as 802.11b and 802.11g. Draft 7.0 of the IEEE 802.11n standard was approved in November 2008. IEEE 802.11n builds on previous 802.11 standards by adding multiple-input multiple-output (MIMO) and Channel-bonding/40 MHz operation to the physical (PHY) layer, and frame aggregation to the MAC layer. MIMO nodes use multiple transmitter and receiver antennas to improve the system performance. MIMO is a technology which uses multiple antennas to coherently resolve more information than possible using a single antenna. Two important benefits it provides to 802.11n are antenna diversity and spatial multiplexing. MIMO technology relies on multipath signals. Multipath signals are the reflected signals arriving at the receiver some time after the line of sight (LOS) signal transmission has been received. In a non-MIMO based 802.11a/b/g network, multipath signals were perceived as interference degrading a receiver's ability to recover the message information in the signal. MIMO uses the multipath signal's diversity to increase a receiver's ability to recover the message information from the signal.

MIMO technology uses Spatial Division Multiplexing (SDM). SDM spatially multiplexes multiple independent data streams, transferred simultaneously within one spectral channel of bandwidth. MIMO SDM can significantly increase data throughput as the number of resolved spatial data streams is increased. Each spatial stream requires a discrete antenna at both the transmitter and the receiver. In addition, MIMO technology requires a separate radio frequency chain and analog-to-digital converter for each MIMO antenna which translates to higher implementation costs compared to non-MIMO systems.

Channel Bonding, also known as forty (40) MHz, is a second technology incorporated into 802.11n which can simultaneously use two separate non-overlapping channels to transmit data. Channel bonding increases the amount of data that can be transmitted forty (40) MHz mode of operation uses two (2) adjacent twenty (20) MHz bands. This allows direct doubling of the PHY data rate from a single twenty (20) MHz channel. A node that is capable of operating in either 20/40 MHz mode can dynamically choose between 20 MHz or 40 MHz for each packet transmission.

Thus, coupling MIMO architecture with wider bandwidth channels offers the opportunity of creating very powerful yet cost-effective approaches for a significant increase in the maximum raw (PHY) data rate.

Nodes in traditional mesh networks (e.g. node based on IEEE 802.11a/b/g technologies) generally transmit over fixed radio frequency (RF) bandwidth (for example, 20 MHz) single stream and 800 nanosecond (ns) guard interval throughout. Most of the traditional link metric computation methodologies in such network implicitly assume fixed bandwidth, single stream and fixed guard interval.

However, with the introduction of MIMO and IEEE 802.11n radios, assumptions of fixed bandwidth, single stream and fixed guard interval are not true during the link metric computation. For instance, in one implementation, IEEE 802.11n device can use two different bandwidths, four different streams and two different guard intervals for packet transmission. The choice of bandwidth and number of streams can dynamically change for each packet transmission. In IEEE 802.11n systems, these factors are dynamic on each link, and should therefore be factored in link metric computations to differentiate between an IEEE 802.11n link and non-IEEE 802.11n link while making routing decisions. As such, it would be desirable to provide new link metrics that take into account these dynamic link properties. In the disclosed embodiments, link metrics are defined that incorporate cost associated with bandwidth, spatial streams and guard interval. Prior to describing the disclosed embodiments a MIMO-enabled node will now be described with reference to FIG. 2.

Node

Figure 2:
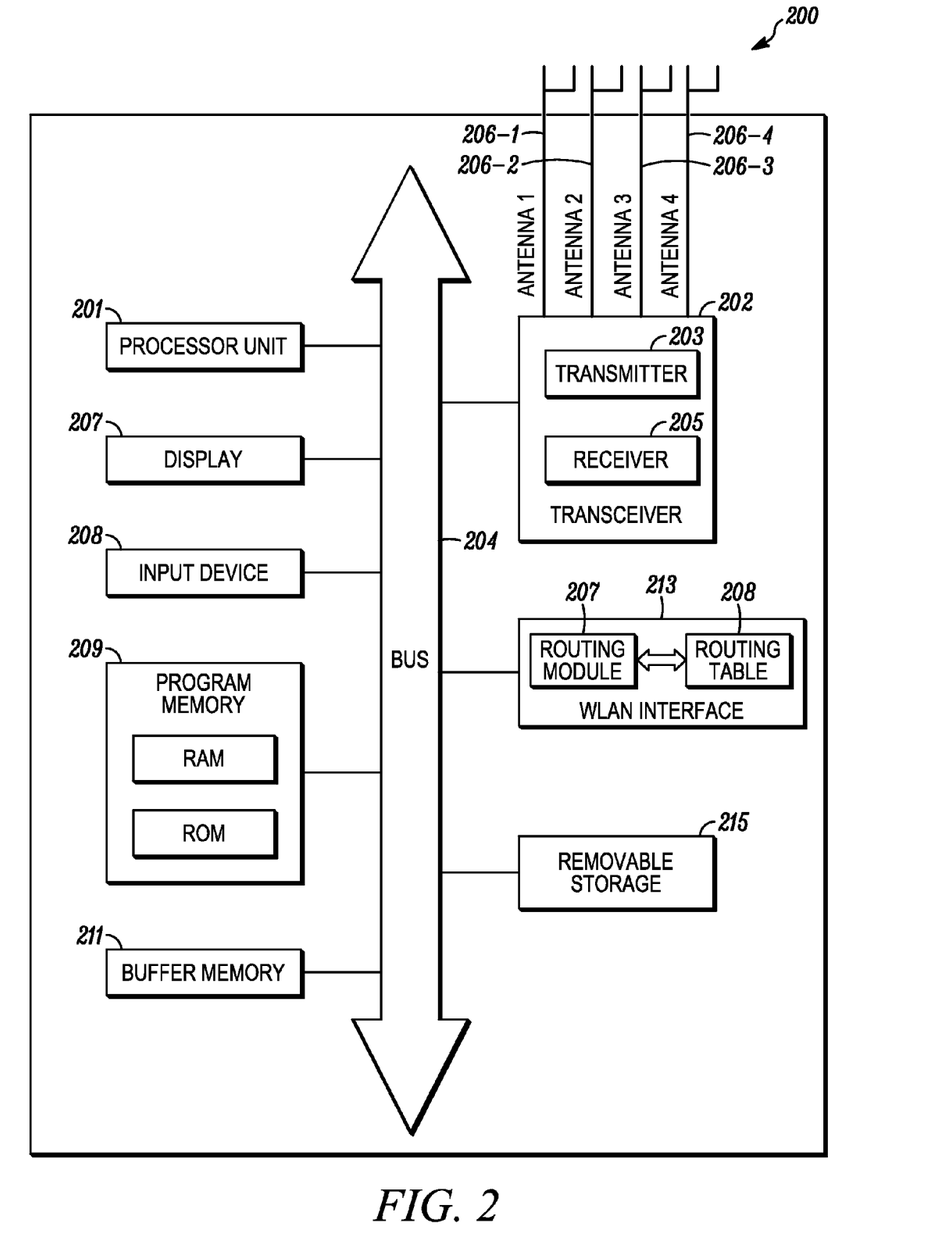
FIG. 2 is a block diagram of a Multiple-Input Multiple-Output (MIMO)-enabled node for use in a MIMO wireless network.

FIG. 2 is a block diagram of a MIMO-enabled node 200. The node 200 comprises a processor 201, a transceiver 202 including a transmitter circuitry 203 and a receiver circuitry 205, a plurality (two or more) of antennas 206-1 through 206-4, a display 207, an input device 208, a program memory 209 for storing operating instructions that are executed by the processor 201, a buffer memory 211, one or more communication interfaces including at least one wireless local area network (WLAN) interface 213 comprising a routing module 207 and a routing table 208, and a removable storage unit 215. Although not shown, the node 200 also can include an antenna switch, duplexer, circulator, or other highly isolative means (not shown) for intermittently providing information packets from the transmitter circuitry 203 to the antennas 206 and from the antennas 206 to the receiver circuitry 205. The node 200 can be an integrated unit containing at least all the elements depicted in FIG. 2, as well as any other elements necessary for the node 200 to perform its particular functions. Alternatively, the node 200 can comprise a collection of appropriately interconnected units or devices, wherein such units or devices perform functions that are equivalent to the functions performed by the elements of the node 200. For example, the node 200 can comprise a laptop computer and a wireless LAN (local area network) card.

The processor 201 can include one or more microprocessors, microcontrollers, DSPs (digital signal processors), state machines, logic circuitry, or any other device or devices that process information based on operational or programming instructions. Such operational or programming instructions can be, for example, stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions can be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 Worldwide Interoperability for Microwave Access (WiMax), and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 can be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one bandwidth and optionally multiple bandwidths, if the communications with the proximate device are in a frequency band other than that of the network communications. The receiver circuitry 205 can optionally comprise a first receiver and a second receiver, or one receiver capable of receiving in two or more bandwidths. The transceiver 202 includes at least one set of transmitter circuitry 203. The at least one transmitter 203 can be capable of transmitting to multiple devices on multiple frequency bands. As with the receiver 205, dual transmitters 203 can optionally be employed where one transmitter is for the transmission to a proximate node or direct link establishment to WLANs and the other transmitter is for transmission to a cellular base station, for example.

Because node 200 is MIMO capable it includes multiple antennas 206-1 through 206-4. As appreciated by those skilled in the art, MIMO is one of the smart antenna technologies where multiple antennas at both transmitter and receiver are used to minimize errors and optimize data speed thus achieving higher link reliability and data throughput. The antennas 206-1 through 206-4 can be any known or developed structure for radiating and receiving electromagnetic energy in the frequency range containing the wireless carrier frequencies. In this implementation, four antennas are shown; however, in other embodiments two or more antennas can be utilized. In a MIMO system the channel capacity can increase as the number of antennas is increased, proportional to the minimum number of transmit and receive antennas. A high rate signal is split into multiple lower rate streams and each stream is transmitted from a different transmit antenna in the same frequency channel. If these signals arrive at the receiver antenna array with sufficiently different spatial signatures, the receiver can separate these streams, creating parallel channels for simultaneous data transmission. Spatial multiplexing is a very powerful technique for increasing channel capacity at higher Signal to Noise Ratio (SNR).

The buffer memory 211 can be any form of volatile memory, such as RAM, and is used for temporarily storing received information packets in accordance with the present invention.

When the node 200 is constructed to receive video information from a video source, the node 200 further can include a video decoder capable of decoding the current Moving Picture Experts Group (MPEG) standard or some other video decoding standard. When the node 200 is further capable of transmitting video information, the node 200 further can include a video encoder capable of encoding the video data into at least one of the foregoing video standards. Such video encoder and decoder can be, for example, implemented as part of the processor 201.

As illustrated in FIG. 2, the routing module 207 and the routing table 208 are communicatively coupled, and located within the WLAN interface 213. However, in some implementations, the routing table 208 can be maintained by the routing module 207 and stored in memory 209.

When a node detects the presence of a neighbor node within its communication range, for example, by receiving a management frame, beacon or other regularly transmitted or periodic message such as a presence message or HELLO message, the routing module 207 of the node 200 can add the neighbor node to a neighbor node table by populating the neighbor node table with information about the neighbor node. Depending upon the implementation, some examples of some of the attributes stored in the neighbor node table include a neighbor node list, an active route list and a proxy list, and parameters such as Link Quality Measurements (LQMs) (which account for the quality of a wireless link with the particular neighbor node), routing metrics (which account for metrics along a route to the particular neighbor node), mobility domain information comprising a mobility domain value advertised by the particular neighbor node, mobility information about the particular neighbor node (e.g., fixed or mobile); and security association state information regarding whether or not a security association is already established with a neighbor node.

In one embodiment, in addition to performing routing functions, the routing module 207 can also control information that is entered into the routing table 208.

In general, a routing table maintained by a mesh node (or IAP) can includes a plurality of rows, where each row is a "route entry," and a plurality of columns that specify route information for each route entry. The route information specified for each route entry includes: a destination address (e.g. media access control (MAC) address or Internet Protocol (IP) address) of a destination node, a next hop address of a next hop node to reach the destination node, a data rate to the next hop node that provides the data rate over the mesh communication links between the node maintaining the routing table and the next hop node towards the destination node, any information needed to compute link metrics including that described below with reference to the equations (1) through (7), any information needed to compute path metrics, etc. In one implementation, the route information in the "data rate to the next hop node" column can be referred to as a rate selection table. The precursor list essentially describes the parent-child relationship of this node in a branch of the tree. For example, in a route entry for an intermediate mesh node of the IAP (i.e., route entry having destination address set to that of the IAP), the precursor list will have downlink child mesh nodes which are using the current mesh node to reach the IAP. The precursor list can be created during the route formation as is described in many existing routing protocols such as the AODV routing protocol and MSR protocol described above.

Overview

Wireless mesh networks uses link metrics to compare and select routes for the destination. Link Metric (LM) generally denotes the "cost" of a link. Cost can be demonstrated as number of transmissions required on the link or an estimated or expected transmission time for communicating a packet over a wireless link. As described above, link metrics used in mesh networks today do not consider the dynamic factors of RF Channel Bandwidth, number of spatial streams or guard interval usage that can change for each packet transmission over a certain link. See, for example, United States Patent Application Publication Number 20040260808 entitled "Method to provide a measure of link reliability to a routing protocol in an ad hoc wireless network," published Oct. 23, 2004, and United States Patent Application Publication Number 20040246935 entitled "System and method for characterizing the quality of a link in a wireless network," published on Dec. 9, 2004, which are incorporated by reference herein in their entirety.

With the advent of IEEE 802.11n radios, link metric methodology computing link 'cost' or expected transmission time should incorporate MIMO cost factors of using multiple spatial streams, dynamic bandwidth selection and guard interval for communication over wireless links. As such, in accordance with embodiments of the present disclosure, new link metrics are defined that are optimized for use in wireless MIMO mesh networks, such as IEEE 802.11n-based mesh networks.

Figure 3:
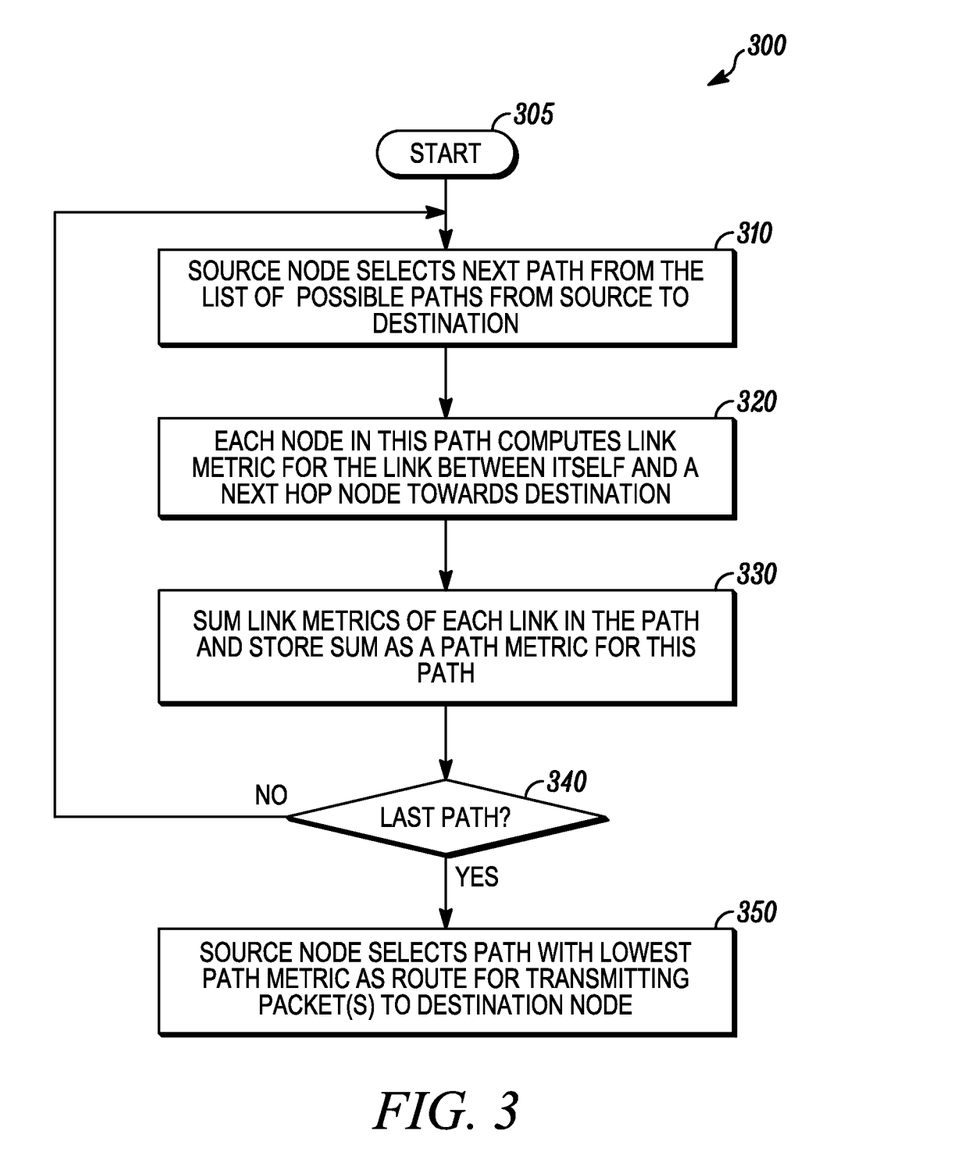
FIG. 3 is flow chart illustrating a method for selecting one of a plurality of paths/routes to a destination node in accordance with some embodiments.

FIG. 3 is flow chart illustrating a method 300 for selecting one of a plurality of paths/routes to a destination node in accordance with some embodiments. The method 300 can be used by a source node 120-1 for selecting one of a plurality of paths/routes to a destination node 120-6. In the example described in FIG. 3, the link metric and path metric computation will be described with reference to an AODV or MSR type of routing protocol. However, it should be appreciated that the method of computing the link metric can be used with any other routing protocol such as those where each node along a particular path can make a decision of the best next-hop to use when routing information.

Method 300 starts at step 305, and at step 310 the source node 120-1 selects a next path from a list of possible paths to the destination node 120-6. For this path, the source node 120-1 calculates a path metric based on a sum of individual link metrics for each communication link in the path that was selected at step 310. The calculation performed by each node for each link in the selected path is described in greater detail below.

At step 320, each node in the selected path computes its own link metric for the link between itself and a next-hop node towards the destination node. The next hop node is the next node along the selected path towards the destination node. As such, each node along the path individually computes its own link metric for the link between itself and next-hop node towards destination. Therefore, in the example of FIG. 1, source node 120-1 will compute a link metric for link 'd' between itself and intermediate node C 120-4, intermediate node C 120-4 will compute a link metric for link 'e' between itself and intermediate node E 120-5, and intermediate node E 120-5 will compute a link metric for link 'f' between itself and destination node D 120-6.

The link metric calculated for each link explicitly considers, among other variables, bandwidth, number of spatial streams and the guard interval used on the link, and therefore captures the cost (or estimated transmission time) associated with using a certain bandwidth, a certain number of spatial streams and/or a certain guard interval over the link. As used, herein the term "bandwidth" refers to measure of the width of a range of frequencies, measured in hertz or width of the channel spectrum used for packet transmission. For example, in 802.11n system, bandwidth used for packet transmission can be either twenty (20) MHz or forty (40) MHz. As used, herein the term "spatial stream" refers to the number of individually encoded signals that can be sent over air in parallel between the transmitter and receiver antennas. For example, in 802.11n system, up to 4 spatial streams can be used for packet transmission, i.e., 4 independent data flows or signals can be supported between a pair of transmitter and receiver. Note that the number of spatial streams that can be multiplexed over the air is dependent on the number of transmitting antennas. In digital communication, data is packed in symbols, where each symbol represents a message comprising N bits. Each symbol is preceded by a guard interval, which is part of the total symbol length. Guard interval helps ensure that symbols do not interfere with one another. In a wireless medium, receiver can receive multiple reflections of same symbol due to multipath, and the like. The larger the guard interval, the greater the protection from propagation delays, echoes and reflections during packet reception, but at the same time the number of bits per symbol is reduced when the guard interval increases since the guard interval is part of a symbol length (which is usually fixed), and therefore the number bits that can be packed in this symbol is reduced and a smaller number of bits is transferred. In an IEEE 802.11n system, for example, the guard interval can be four-hundred (400) ns and eight hundred (800) ns.

Although not illustrated at step 320, each intermediate node along the path eventually provides the link metric it calculated to the source node 120-1 so that the source node 120-1 has the link metrics for each link along the particular path that was selected at step 310. This can be done via a message exchange with the intermediate nodes along the selected path. In one implementation, the source node 120-1 can obtain the link metrics for each link by sending a route request (RREQ) message to the intermediate nodes, and each intermediate node will respond with route reply (RREP) messages that include the link metric for their link along that route or path.

At step 330, the source node 120-1 sums the calculated link metrics for each communication link in the path that was selected at step 310, and stores the sum of the link metrics as a path metric for the path that was selected at step 310. In other words, after the source node 120-1 has the link metrics of all the links in the path, the source node 120-1 can sum these link metrics to generate a path metric for the particular path that was selected at step 310. When step 330 is applied to the example of FIG. 1, source node 120-1 will sum the link metrics that were computed for the path with links a, b, c. Likewise, on another iteration through FIG. 3, source node 120-1 will sum the link metrics that were computed for the path with links d, e, f. As described below with reference to step 350, the source node 120-1 ultimately selects the lowest cost path towards destination node 120-6 as the path to use for communicating with the destination node 120-6.

At step 340, the source node 120-1 determines if the path that was selected at step 310 is the last path in the list of possible paths to the destination node 120-6. If not, then method 300 loops back to step 310 so that the source node 120-1 can select a next path from the list of possible paths to the destination node 120-6.

If the source node 120-1 determines that the path that was selected at step 310 is the last path in the list of possible paths to the destination node 120-6, then method 300 proceeds to step 350, where the source node 120-1 can select the path that was determined to have the best path metric as the route for transmitting packet(s) to the destination node 120-6. The "best" path metric is the path metric that has the lowest communication cost (i.e., that uses the least amount of communication resources). For example, a path metric generally attempts to quantify how quick and reliable transmissions are over the path. In one implementation, the path metric can indicate an estimated transmission time of a packet over an end-to-end path. This estimated transmission time can also be denoted as cost of the path. Using this definition of path metric, smaller the transmission time or cost of a particular path, the better the path is for data communication. When step 350 is applied to the example of FIG. 1, the source node 120-1 selects the particular path (either the path with links a, b, c or the path with links d, e, f) that has the best path metric as the path it will use for transmitting information to the destination node (i.e., the particular path that has the "lowest" path metric which represents the lowest cost (or estimated transmission time) of communicating information from source node 120-1 to destination node 120-6 in terms of communication resources utilized).

Figure 4:
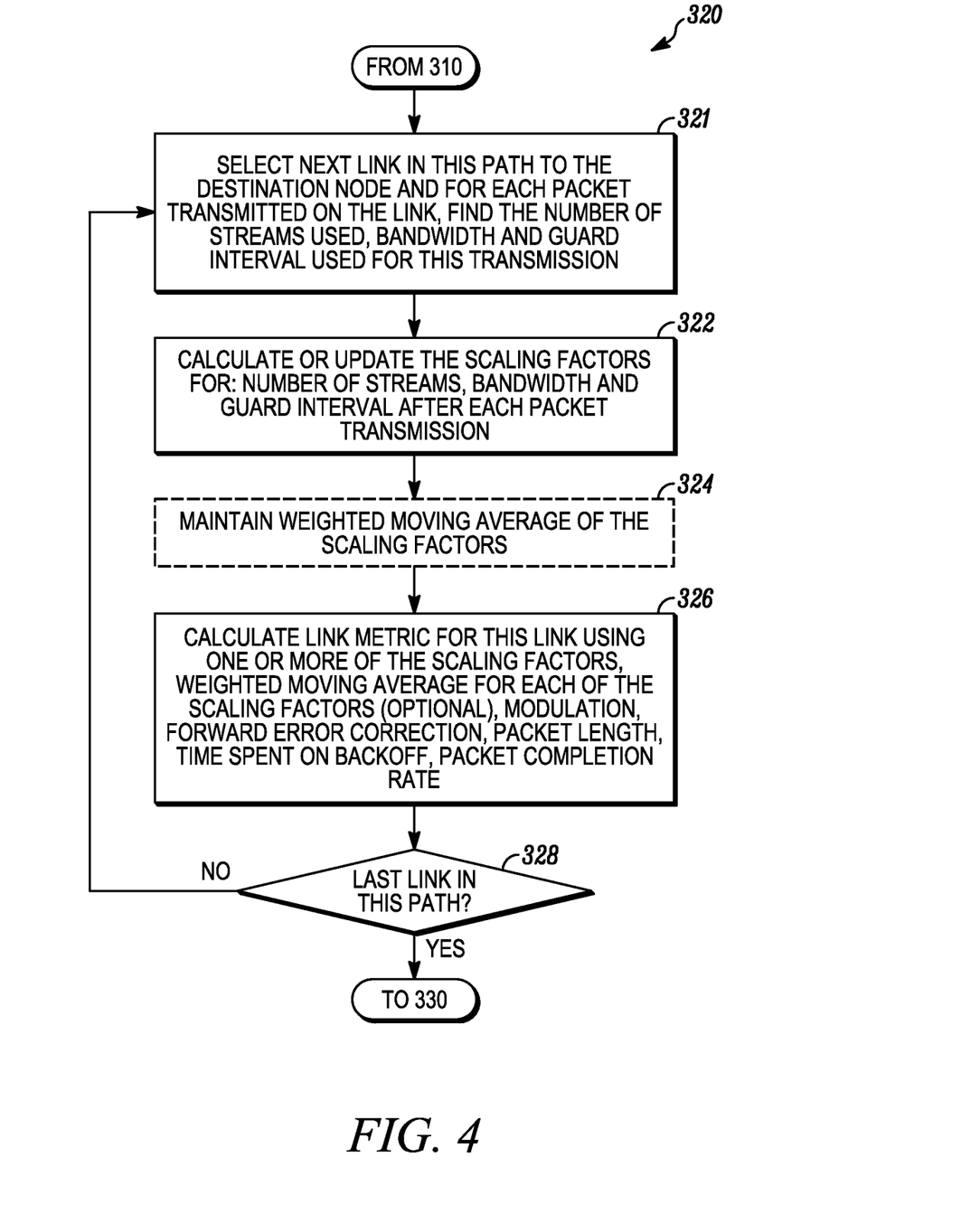
FIG. 4 is flow chart illustrating a method performed at a node for computing a link metric for a communication link between the node and another node in accordance with some embodiments.

FIG. 4 is flow chart illustrating a method 320 performed at a node for computing a link metric for a communication link between the node and another node in accordance with some embodiments. For sake of simplicity, method 320 will be described with respect to the source node 120-1 only and how it computes a link metric for a communication link 'd' between the source node 120-1 and a next hop node 120-4 along a particular path (d+e+f) towards the destination node 120-6. However, as indicated by step 328 and the 'no' decision, this computation is performed separately by each node along a path (except for the destination node) to determine a link metric for the communication link between that node and its next hop node. In other words, the method 320 is repeated by every node along a particular path to determine a link metric for the communication link shared by that node and a next hop node towards the destination node. In addition, this same method would be applied for each communication link on path (a+b+c) and would be applied for each communication link on any additional paths (not shown in FIG. 1) between the source node 120-1 and the destination node 120-6.

At step 321, after a packet is transmitted, the source node 120-1 selects a next link in a particular communication path, and determines the number of streams used for communicating the packet over the link 'd' with next hop node 120-4, the bandwidth used for communicating the packet over the link 'd' with next hop node 120-4, and the guard interval used for communicating the packet over the link 'd' with next hop node 120-4. The number of streams, bandwidth and gaud interval can dynamically change or vary with each packet that is transmitted. At step 322 the source node 120-1 determines (computes) scaling factors for two or more of: a scaling factor for the number of streams used for communicating the packet over the link 'd' with next hop node 120-4, a scaling factor for the bandwidth used for communicating the packet over the link 'd' with next hop node 120-4, and a scaling factor for the guard interval used for communicating the packet over the link 'd' with next hop node 120-4. Each of the independent scaling factors can be represented, for example, on a scale from 0 to 1. These scaling factors can be used to identify and to characterize the usage of bandwidth, streams and guard interval over a link. For example, if the system can support maximum 4 streams, factor for stream closer to 0 will indicate only one stream is mostly used over this link for packet transmissions, whereas factor for stream closer to 1 will indicate all 4 streams mostly used over this link.

At step 324, the source node 120-1 maintains an average value (e.g., a weighted moving average) for each of the scaling factors that is determined at step 322.

At step 326, the source node 120-1 calculates a link metric for the communication link 'd'. The link metric is calculated based on at least two of bandwidth, number of spatial streams and guard interval, and corresponding average values (e.g., a weighted moving average) of at least two of the scaling factors that is determined at step 324. Thus, the method 320 can be used to calculate a link metric for any systems that can utilize a varying number of spatial streams, varying level of channel bandwidth and/or a varying level of guard interval At step 328, the source node 120-1 determines whether the current link is the last link in this path. If so, the method 320 proceeds to step 330. If not, the method 320 loops back to step 321, where the next link in this path is selected and steps 322-328 are repeated until the current link is the last link in this path. For instance, in the example illustrated in FIG. 1, after the source node 120-1 determines the link metric for communication link 'd', node 120-4 would also use the same method 320 to compute a link metric for a communication link 'e' between itself and a next hop node 120-5 along a particular path (d+e+f) towards the destination node 120-6, and node 120-5 would also use the same method 320 to compute a link metric for a communication link 'f' between itself and the next hop node 120-6 along a particular path (d+e+f).

One example of an equation that can be used to calculate a link metric (M) in systems with variable bandwidth, variable guard interval and variable number of spatial streams will now be described with reference to equations (1)-(7). Table 1 explains the variables and parameter definitions used in link metric equation (7).

TABLE 1

| Parameter | Definition | Example Values for IEEE 802.11n |
|---|---|---|
| Nss | Maximum number of streams | 4 |
| Nsu | Number of streams used for last transmission | 1/2/3/4 |
| Nbmax | Maximum channel bandwidth of a system | 40 MHz |
| Nbu | Bandwidth level used for last transmission | 20/40 MHz |
| Nbmin | Minimum bandwidth of a system | |
| Ngmax | Maximum symbol length for a Guard Interval scheme | 4 μs (i.e. 800 ns GI scheme) |
| Ngu | Symbol length (Guard Interval scheme) used for last transmission | 4 μs/3.6 μs (i.e. 800/400 ns GI schemes) |
| Ngmin | Minimum symbol length for a Guard Interval scheme | 3.6 μs (i.e. 400 ns GI scheme) |
| Pss | Scaling factor for spatial stream usage | Calculated using equation 1 |
| Pbs | Scaling factor for bandwidth usage | Calculated using equation 2 |
| Pgs | Scaling factor for guard interval usage | Calculated using equation 3 |
| λ | Smoothing factor, depends on inter-arrival time | |
| $t_s$ | Total transmission time including overheads as a function of modulation, FEC and packet length. | |
| $t_e$ | Time spent on backoffs | |
| PCR | Packet completion rate | |
| Mod | Modulation scheme | |
| Fec | Forward error correction | |
| L | Packet length | |

Each node calculates scaling factors for number of streams, bandwidth, and the guard interval after completion of each transmission. Equations (1)-(3) show how to calculate these scaling factors.

$$Pss(t_0) = \frac{Nsu - 1}{Nss - 1} \quad (1)$$

$$Pbs(t_0) = \frac{Nbu - Nbmin}{Nbmax - Nbmin} \quad (2)$$

$$Pgs(t_0) = \frac{Ngmax - Ngu}{Ngmax - Ngmin} \quad (3)$$

Note that with guard interval, the symbol time is used in calculation of factor as symbol time defines time taken to send specific amount of data. For example, four (4) μs for an eight hundred (800) ns guard interval, 3.6 μs for a 400 ns guard interval. Since packets are transmitted at irregular intervals, it is necessary to maintain exponentially weighted moving average. Equations (4), (5), (6) show how a weighted moving averages the scaling factors are computed.

$$Ps(t) = \lambda \cdot Pss(t_0) + (1-\lambda) \cdot Ps(t_{-1}) \quad (4)$$

$$Pb(t) = \lambda \cdot Pbs(t_0) + (1-\lambda) \cdot Pb(t_{-1}) \quad (5)$$

$$Pg(t) = \lambda \cdot Pgs(t_0) + (1-\lambda) \cdot Pg(t_{-1}) \quad (6)$$

... where (t) is the current average value, and $(t_{-1})$ is the previous average value. In equation (4), for example, Ps(t) is weighted moving average of scaling factor for stream usage, Pss is instantaneous value for stream usage, and $Ps(t_{-1})$ is a value for stream usage that is used to average out the instantaneous value for stream usage with previously computed value(s) for stream usage so that weight is given to the old value for stream usage and to the new value for stream usage. The same applies to equations (5) and (6). Scaling factors provides a normalized way of viewing the expected contributions of these factors. Scaling factors can range between 0 and 1 and can be used to characterize an average estimate of bandwidth, number of streams and guard interval usage during packet transmission. For example, the value of the scaling factor for bandwidth (Pb) will be closer to 0 will indicate that 20 MHz is mostly used for packet transmission, whereas when the value of the scaling factor for bandwidth (Pb) is close to 1, this will indicate 40 MHz is mostly used during packet transmissions in a 20/40 MHz system.

Once the scaling factors are known, the link metrics can be calculated using equation (7) below.

$$LM = \frac{t_s\{mod\_Fec, L\} + t_e}{PCR^*(1 + (Nss - 1) \cdot Ps(t)) \cdot \left(1 + \left(\frac{Nbmax}{Nbmin} - 1\right) \cdot Pb(t)\right) \cdot \left(1 + \left(\frac{Ngmax - Ngmin}{Ngu}\right) \cdot Pg(t)\right)} \quad (7)$$

In equation (7), the variable "PCR" is Packet Completion Rate, which is the inverse of total number of transmission attempts required for successful transmission. Transmission of a packet can require multiple retries or retransmissions before it is successfully received. Successful transmission is usually denoted by acknowledgement received by transmitter from the receiver for successful reception. The time spent on backoffs (te) is a variable that accounts for over-head times like queuing delays, and backoff time between multiple retries. A packet can sit in hardware queues and wait for it's chance to be picked for transmission attempt. Also, when transmission attempt fails, most of MAC protocols (e.g. IEEE 802.11 MAC) wait a random time before next transmission attempt of the packet to reduce collision probability. This is referred as backoff.

Equation (7) can also be used to calculate a link metric for legacy IEEE 802.11a/b/g technologies, in which bandwidth, number of streams and guard interval is fixed throughout the communication over wireless links. In other words, traditional link metric methodologies computing estimated transmission time is a special case of generalized equation (7). Doubling the systems bandwidth will reduce the link metrics (i.e. cost of transmission) value by half. Similarly, using 2, 3 or 4 streams will decrease the link metrics value (i.e. transmission time of a packet) by the factor of ½, ⅓ and ¼ as compared to single stream system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that can cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like can be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but can include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but can also be configured in ways that are not listed.

It will be appreciated that some embodiments can be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selecting one of a plurality of paths between a source node and a destination node in an ad-hoc multi-hopping peer-to-peer wireless communications network with MIMO capability based on link metrics (LMs) for each of the paths, the method comprising:

selecting, at a source node, a first path from the plurality of possible paths to the destination node, wherein the first path comprises one or more communication links that wirelessly connect the source node to the destination node;

determining, at each node along the first path after each transmission on that communication link towards the next-hop node, a corresponding LM for each communication link between each particular node and next-hop node towards the destination node in the first path, wherein each LM is determined using an equation:

$$LM = \frac{t_s\{\text{mod\_Fec}, L\} + t_e}{PCR^*(1 + (Nss - 1) \cdot Ps(t)) \cdot \left(1 + \left(\frac{Nb\max}{Nb\min} - 1\right) \cdot Pb(t)\right) \cdot \left(1 + \left(\frac{Ng\max - Ng\min}{Ngu}\right) \cdot Pg(t)\right)}$$

wherein:

$t_s$ is a total transmission time including overhead as a function of modulation scheme (mod), forward error correction (Fec), and packet length (L), $t_e$ is time spent on backoffs, PCR is packet completion rate, Nss is a maximum number of spatial streams that are possible to use during transmissions, Nbmax is a maximum channel bandwidth that is possible to use during transmission, Nbmin is a minimum channel bandwidth that is possible to use during transmission, Ngmax is a maximum symbol length that is possible to use during transmission;

Ngu is a symbol length indicative of the guard interval scheme was used for the last transmission, Ngmin is a minimum symbol length that is possible to use during transmission;

Ps(t) is an exponentially weighted moving average of a scaling factor for the number of streams that have been used during recent transmissions, Pb(t) is an exponentially weighted moving average of a scaling factor for the bandwidth usage during recent transmissions, and Pg(t) is an exponentially weighted moving average of a scaling factor for the guard interval that has been used during recent transmissions; and summing, at the source node, the link metrics (LMs) for each communication link along the path to generate a path metric for the first path.

2. The method according to claim 1, further comprising:

repeating the selecting determining, and summing operations for each of the plurality of paths from the source node to the destination node; and determining, at the source node after performing the selecting, determining, and summing operations for each path of the plurality of paths from the source node to the destination node, which particular one of the plurality of paths from the source node to the destination node has a best path metric;

selecting, at the source node, the particular one of the plurality of paths from the source node to the destination node that is determined to have the best path metric as the route for transmitting packet(s) to the destination node.

3. The method according to claim 1, wherein the exponentially weighted moving average of the scaling factor (Ps(t)) for the number of streams is determined based on an equation:

$$Ps(t)=\lambda \cdot Pss(t_0)+(1-\lambda)\cdot Ps(t_{-1}),$$

where $$Pss(t_0) = \frac{Nsu - 1}{Nss - 1},$$

and wherein:

(Ps(t)) is the current average value of the scaling factor (Ps(t)) for the number of streams usage during recent transmissions, λ is a smoothing factor that depends on inter-arrival time, Pss($t_0$) is instantaneous value of the scaling factor for stream usage during the last transmission, Ps($t_{-1}$) is the previous weighted moving average value of the scaling factor for stream usage during recent transmissions, Nsu is a number of streams used for the last transmission, and Nss is the maximum number of streams.

4. The method according to claim 1, wherein the exponentially weighted moving average of the scaling factor (Pb(t)) for the bandwidth is determined based on an equation:

$$Pb(t)=\lambda \cdot Pbs(t_0)+(1-\lambda)\cdot Pb(t_{-1}),$$

where $$Pbs(t_0) = \frac{Nbu - Nbmin}{Nbmax - Nbmin},$$

and wherein:

(Pb(t)) is the current average value of the scaling factor (Pb(t)) for the bandwidth used during recent transmissions, λ is a smoothing factor that depends on inter-arrival time, Pbs($t_0$) is instantaneous value of scaling factor for bandwidth usage used during a last transmission, Pb($t_{-1}$)) is the previous average value of the scaling factor (Pb(t)) for the bandwidth that was used for the last transmission, Nbu is a bandwidth level used for last transmission, Nbmax is a maximum channel bandwidth that is possible to use during transmission, and Nbmin is a minimum channel bandwidth that is possible to use during transmission.

5. The method according to claim 1, wherein the exponentially weighted moving average of the scaling factor (Pg(t)) for the guard interval is determined based on an equation:

$$Pg(t)=\lambda \cdot Pgs(t_0)+(1-\lambda)\cdot Pg(t_{-1}),$$

where $$Pgs(t_0) = \frac{Ngmax - Ngu}{Ngmax - Ngmin},$$

and wherein:

(Pg(t)) is the current average value of the scaling factor (Pg(t)) for the guard interval used during recent transmissions, λ is a smoothing factor that depends on inter-arrival time, Pgs($t_0$) is instantaneous value of scaling factor for guard interval usage that was used for the last transmission, Pg($t_{-1}$)) is the previous average value of the scaling factor for guard interval usage that was used for the last transmission, Ngmax is a maximum symbol length that is possible to use during transmission, Ngu is a symbol length indicative of the guard interval scheme used for last transmission, and Ngmin is a minimum symbol length that is possible to use during transmission.

6. The method according to claim 1, wherein each link metric represents an estimated transmission time associated with communicating information over a particular communication link, and wherein the best path metric is the one of the plurality of path metrics for a particular path that is determined to have a lowest estimated transmission time associated with communicating information to the destination node.

7. A method for determining a link metric for a communication link, the method comprising:

determining, at a particular node, a link metric (LM) for the communication link between the particular node and a next-hop node towards a destination node, wherein the link metric (LM) is determined using an equation:

$$LM = \frac{t_s\{mod\_Fec, L\} + t_e}{PCR^*(1 + (Nss - 1) \cdot Ps(t)) \cdot \left(1 + \left(\frac{Nbmax}{Nbmin} - 1\right) \cdot Pb(t)\right) \cdot \left(1 + \left(\frac{Ngmax - Ngmin}{Ngu}\right) \cdot Pg(t)\right)}$$

$t_s$ is a total transmission time including overhead as a function of modulation scheme (mod), forward error correction (Fec), and packet length (L), $t_e$ is time spent on backoffs, PCR is packet completion rate, Nss is a maximum number of spatial streams that are possible to use during transmission, Nbmax is a maximum channel bandwidth that is possible to use during transmission;

Nbmin is a minimum channel bandwidth that is possible to use during transmission;

Ngmax is a maximum symbol length that is possible to use during transmission;

Ngu is a symbol length indicative of the guard interval scheme was used for the last transmission;

Ngmin is a minimum symbol length that is possible to use during transmission;

Ps(t) is an exponentially weighted moving average of a scaling factor for the number of streams that have been used during recent transmissions;

Pb(t) is an exponentially weighted moving average of a scaling factor for the bandwidth usage during recent transmissions; and Pg(t) is an exponentially weighted moving average of a scaling factor for the guard interval that has been used during recent transmissions, wherein a source node uses the determined LM in a path selection operation.

8. The method according to claim 7, wherein the exponentially weighted moving average of the scaling factor (Ps(t)) for the number of streams is determined based on an equation:

$$Ps(t) = \lambda \cdot Pss(t_0) + (1-\lambda) \cdot Ps(t_{-1}),$$

where $$Pss(t_0) = \frac{Nsu - 1}{Nss - 1},$$

and wherein:

(Ps(t)) is the current average value of the scaling factor (Ps(t)) for the number of streams usage during recent transmissions, $\lambda$ is a smoothing factor that depends on inter-arrival time, $Pss(t_0)$ is instantaneous value of the scaling factor for stream usage during the last transmission, $Ps(t_{-1})$ is the previous weighted moving average value of the scaling factor for stream usage during recent transmissions, Nsu is a number of streams used for the last transmission, and Nss is the maximum number of streams.

9. The method according to claim 7, wherein the exponentially weighted moving average of the scaling factor (Pb(t)) for the bandwidth is determined based on an equation:

$$Pb(t) = \lambda \cdot Pbs(t_0) + (1-\lambda) \cdot Pb(t_{-1}),$$

where $$Pbs(t_0) = \frac{Nbu - Nbmin}{Nbmax - Nbmin},$$

and wherein:

(Pb(t)) is the current average value of the scaling factor (Pb(t)) for the bandwidth used during recent transmissions, $\lambda$ is a smoothing factor that depends on inter-arrival time, $Pbs(t_0)$ is instantaneous value of scaling factor for bandwidth usage used during a last transmission, $Pb(t_{-1})$ is the previous average value of the scaling factor (Pb(t)) for the bandwidth that was used for the last transmission, Nbu is a bandwidth level used for last transmission, Nbmax is a maximum channel bandwidth that is possible to use during transmission, and Nbmin is a minimum channel bandwidth that is possible to use during transmission.

10. The method according to claim 7, wherein the exponentially weighted moving average of the scaling factor (Pg(t)) for the guard interval is determined based on an equation:

$$Pg(t) = \lambda \cdot Pgs(t_0) + (1-\lambda) \cdot Pg(t_{-1}),$$

where $$Pgs(t_0) = \frac{Ng\max - Ngu}{Ng\max - Ng\min},$$

and wherein:

(Pg(t)) is the current average value of the scaling factor (Pg(t)) for the guard interval used during recent transmissions, $\lambda$ is a smoothing factor that depends on inter-arrival time, $Pgs(t_0)$ is instantaneous value of scaling factor for guard interval usage that was used for the last transmission, $Pg(t_{-1})$ is the previous average value of the scaling factor for guard interval usage that was used for the last transmission, Ngmax is a maximum symbol length that is possible to use during transmission, Ngu is a symbol length indicative of the guard interval scheme used for last transmission, and Ngmin is a minimum symbol length that is possible to use during transmission.

11. The method according to claim 7, wherein each link metric represents an estimated transmission time associated with communicating information over a particular communication link.

12. A node, comprising:

a processor designed configured to determine a link metric for a communication link between the node to and a next-hop node towards a destination node, wherein the link metric (LM) is determined using an equation:

$$LM = \frac{t_s\{mod\_Fec, L\} + t_e}{PCR^*(1 + (Nss-1) \cdot Ps(t)) \cdot \left(1 + \left(\frac{Nb\max}{Nb\min} - 1\right) \cdot Pb(t)\right) \cdot \left(1 + \left(\frac{Ng\max - Ng\min}{Ngu}\right) \cdot Pg(t)\right)}$$

wherein:

$t_s$ is a total transmission time including overhead as a function of modulation scheme (mod), forward error correction (Fec), and packet length (L), $t_e$ is time spent on backoffs, PCR is packet completion rate, Nss is a maximum number of spatial streams that are possible to use during transmission, Nbmax is a maximum channel bandwidth that is possible to use during transmission;

Nbmin is a minimum channel bandwidth that is possible to use during transmission;

Ngmax is a maximum symbol length that is possible to use during transmission;

Ngu is a symbol length indicative of the guard interval scheme was used for the last transmission;

Ngmin is a minimum symbol length that is possible to use during transmission;

Ps(t) is an exponentially weighted moving average of a scaling factor for the number of streams that have been used during recent transmissions;

Pb(t) is an exponentially weighted moving average of a scaling factor for the bandwidth usage during recent transmissions; and Pg(t) is an exponentially weighted moving average of a scaling factor for the guard interval that has been used during recent transmissions, wherein a source node uses the determined LM in a path selection operation.

13. The node according to claim 12, wherein each link metric represents an estimated transmission time associated with communicating information over a particular communication link.

* * * * *